Patented June 28, 1938

2,121,917

UNITED STATES PATENT OFFICE 2,121,917

PROCESS FOR MAKING PHENOL, CRESOL, OR THE LIKE RESINS

Ignaz Kreidl, Vienna, Austria

No Drawing. Application April 23, 1936, Serial No. 76,078. In Austria May 15, 1935

7 Claims. (Cl. 260—4)

This invention relates to artificial resins and condensation products of phenols and homologues thereof, such as more particularly cresols and the like. The known artificial resins consisting of condensation products of phenols and cresols with aldehyde, such as for example formaldehyde, are made by various processes.

The process chiefly used for making phenol and cresol resins is the novolak process. According to the novalak process the phenols or cresols are acid condensed. In this way novolak is obtained which is not further changed by the action of heat and pressure. This novolak is usually converted into resite by hexamethylenetetramine. With this process, however, the drawback arises in the production of cresol resins that such resins cannot be used for moulding purposes, since they corrode the moulds. However, the cresol resins are preferred to phenol resins from the standpoint of economy.

Cresol resins also differ from phenol resins by the fact that they have hardening properties which are quite different from those of phenol resins, and require many times the hardening time of pure phenol resins. At best, therefore, only mixtures of phenol resins and cresol resins possessing only a very small proportion of cresol resins can be used together. In addition the cresols react at different rates, so that one is compelled as far as possible to use cresols which are poor in, or free from, ortho-cresol in order to obtain artificial resins which do not require too long a time to harden.

Processes are also known in which phenols are alkali condensed with aldehyde, such as for example formaldehyde (resol process), this condensation being carried out in three stages, in which, first resol is formed, then resitol and finally resite. This process has the disadvantage that the reaction proceeds violently, almost explosively, so that it is extremely difficult to interrupt the reaction at a definite time point in order to form an intermediate product of certain properties, that is to say it is impossible to divide the process into its stages, which however is essential for the production of moulding and casting compositions from such condensation products. Furthermore the violence of the reaction endangers the apparatus as well. If attempts are made to tone down the reaction, e. g. by diminishing the quantity of alkali, the yields diminish so that the process is no longer economical.

The resites obtained by the resol process also possess the disadvantage from the point of view of varnish manufacture that they are highly viscous and at ordinary temperature are usually hard and brittle, so that they require comparatively large quantities of solvent for their dissolution.

The present invention rests on the discovery that resins of phenols and homologues thereof, such as more particularly cresol resins, which can be used both individually as well as together as moulding compositions, are obtained in practically quantitative yield if the condensation is carried out under alkaline conditions in the presence of alkaline reacting substances which contain sulphur in S-S-linkage, the condensation being with advantage carried out in alkaline conditions.

The invention enables the resol process to be carried out without its disadvantages; for the resol process also the process provided by the invention has the particular advantage that the reaction is controlled with maintenance of an approximately quantitative yield.

Such cresol resins made in the presence of sulphur in S-S-linkage further possess the advantage that they can be used alone as moulding compositions which do not attack the moulds. In contradistinction to the cresol resins prepared according to the known processes, the cresol resins prepared in accordance with the invention can also be mixed in any proportion with phenol resins, preferably with phenol resins prepared by the same process, and the mixture thereupon employed.

These properties however, also offer the possibility of mixing the starting substances directly in the desired proportion in the presence of alkaline reacting substances containing sulphur in the S-S-linkage, and so condensing in single operation in order to obtain the desired mixed products.

Accordingly, by the process according to this invention on the one hand, properties of the phenol resins and cresol resins can be varied as regards their rate of reaction and rate of polymerization, whilst on the other hand the process affords a means of preparing artificial resins of low viscosity as well as rapidly hardening resins, and in addition a means of obtaining moulding compositions of cresol resins alone as well as in any desired mixture ratio with other resins.

The products prepared according to the process of the invention possess this advantage for the production of varnishes, that products of low viscosity can be obtained, with the result that very small quantities of solvent may be found sufficient for dissolving the resin.

This low viscosity also has a particular advantage for the production of casting resins that rapidly hardening but readily pourable resins can be obtained.

The process according to the invention is carried out by condensing phenol, cresol or the like with aldehyde, more particularly formaldehyde, in the desired proportion in the presence of alkaline reacting substances containing sulphur in the S-S-linkage. The condensation may be carried out with or without catalysts which favour the sulphurization.

Working with catalysts, (and not only catalysts which favour sulphurization but also the usual catalysts which favour the condensation reaction), affords a means of influencing the rate of polymerization or the rate of condensation. Also, resins of different compositions (phenol resins, cresol resins and the like), may be adjusted as regards their rate of hardening and rate of condensation and adapted to one another.

The process may also be carried out in stages in such a manner that the added quantity of the usual catalysts favouring the condensation is varied in different condensation stages, whereby other catalysts which favour the condensation may be used on each occasion as desired.

Thus for example in one preferred manner of carrying out the process phenols or cresols are condensed with aldehydes (preferably formaldehyde) with a molar ratio of aldehyde to phenol, cresol or the like in the finished product of at least 1:1, but preferably in a greater ratio.

It is advantageous to use alkaline reacting polysulphides, more particularly the inorganic polysulphides of the alkalies and alkaline earths, as substances which contain the sulphur in S-S-linkage. However, operations may also be carried out with oxygen-containing substances which have sulphur in S-S-linkage and which either are added as such or form in the course of the reaction in the presence or absence of other substances, such as for example oxidizing agents. More particularly inorganic polythionates may be used or sulphur-containing substances which can go over into polythionates or the like in the presence or absence of other substances more particularly oxidizing agents.

In order to form such oxygen-containing compounds with sulphur in S-S-linkage in the reaction mixture, one may proceed by adding to the reaction mixture sulphur or suitable sulphur-containing substances in conjunction with oxidizing agents. Suitable oxidizing agents are for example chlorine-yielding substances, for example sodium compound of p-toluenesulphochloramide, sodium hypochlorite, in addition persulphates and the like.

All substances which act as vulcanization accelerators in the manufacture of rubber may be used as sulphurizing catalysts, for example compounds of the alkaline earths and especially the vulcanization accelerators known as ultra-accelerators, such as for example dithionic acids, xanthogenic acids and so forth and salts thereof, and preferably vulcanization accelerators which are water-soluble and have been made water soluble.

The reaction velocity may be influenced by the addition of the usual catalysts which influence the condensation, e. g. alkaline reacting substances. Preferably operations are carried out in strongly alkaline solutions.

The condensation product may be freed from adhering water during (e. g. in vacuum) or also after completion of the condensation. The viscosity of the product depends upon the quantity of the usual catalyst influencing the condensation which is employed. It is advisable so to adapt this quantity of catalyst that whilst maintaining a yield which is as near as possible quantitative a resin is obtained of lowest possible viscosity and with satisfactory hardening properties.

The resin so prepared may either be cast as such, dissolved in solvents or pressed together with fillers, if necessary with addition of catalysts.

*Examples*

1. 80 kg. of phenol are dissolved in 86 kg. of technical formaldehyde, then a solution of 4.5 kg. of sodium polysulphide added and the whole boiled under reflux up to the desired degree of resinification. After separating off the supernatant water the occluded water is distilled off in vacuum and the thinly liquid resin cast into molds where it is subjected to the usual hardening process. The yield is about 102 kg. of finished completely clear cast masses.

2. 80 kg. of technical cresol (containing 33% each of ortho-, meta- and para-cresol) are treated with 5 kg. of sodium polysulphide, then 83 kg. of technical formaldehyde are added and the whole heated. After completion of the reaction the water is expelled in vacuum. The resulting resin, which can be poured very easily, is provided with the usual additions, poured into moulds and hardened by suitable heat action. The yield is about 100 kg.

3. 80 kg. of technical cresol are mixed with 83 kg. of technical formaldehyde, 6 kg. of sodium polysulphide and 150 g. of potassium xanthogenate are added and the whole boiled under reflux to the desired degree of condensation. The resulting resin is then repeatedly washed with water and the occluded water distilled off in vacuum. In this way about 102 kg. of a very soft resin are obtained which is worked up in the usual way with filler and additional substances to a rapid press mass which conforms to all requirements.

4. 80 kg. of technical cresol are dissolved in 80 kg. of technical formaldehyde, then 6 kg. of barium polysulphide are added and the whole boiled under reflux. The resin is further processed as in Example 3.

5. 80 kg. of technical cresol are mixed with 89 kg. of technical formaldehyde, further 3 kg. of sodium tetrathionate and 100 g. of potassium xanthogenate, and the whole boiled under reflux until the desired degree of condensation is attained. After distilling off the water the resin (about 108 kg.) of very low viscosity is dissolved in a solvent, e. g. alcohol, if necessary mixed with the usual softeners and pigment and made into varnishes which may be used as hot and cold varnishes.

6. 80 kg. of technical cresol are treated with 83 kg. of technical formaldehyde, 2.5 kg. of sodium polysulphide and 1 kg. of the sodium derivative of p-toluenesulphochloramide. The whole is then boiled up to the desired degree of condensation. The resin obtained (about 104 kg.) may be further processed as in Examples 1–3.

7. 80 kg. of technical cresol are treated with 80 kg. of technical formaldehyde, 4 kg. of sodium polysulphide, 50 g. of thiuram disulphide and 0.25 kg. of sodium hydroxide and the whole boiled to the desired degree of condensation. The resin obtained (amounting to about 105 kg.) is processed as in Examples 1–5.

8. 48 kg. of phenol are dissolved in 32 kg. of technical cresol, then 85 kg. of technical formaldehyde, 5.2 kg. of sodium polysulphide and 750 g. of potassium xanthogenate are added and the mixture boiled under reflux to the desired degree of condensation. The resulting very thinly liquid resin is washed with water and subjected to vacuum distillation. In this way 104 kg. of a clear resin is obtained which is soft in the cold, and which may be converted into a quick moulding powder by admixture with the usual fillers and additional substances.

What I claim is:—

1. A process for producing artificial resins which consists in reacting one of the class consisting of phenol and its homologues with an aldehyde in an alkaline medium, the molecular proportion of aldehyde to the substances of the class of phenol and its homologues being such that the said proportion in the finished product amounts to at least 1:1, in the presence of an alkaline reacting substance containing sulfur in the S-S-linkage.

2. A resinous composition produced by reacting at least one substance selected from the group consisting of phenol and its homologues and an aldehyde in an alkaline medium, the molecular proportion of aldehyde to the phenol or its homologues being such that the said proportion in the finished product amounts to at least 1:1 in the presence of a sulfur compound in which sulfur atoms are in S-S-linkage.

3. A resinous composition according to claim 2 in which the compound having sulfur in S-S-linkage is an alkaline polysulphide.

4. A resinous composition as set forth in claim 1 in which the sulfur compound is an alkaline polythionate.

5. A resinous composition produced by reacting at least one substance selected from the group consisting of phenol and its homologues and a formaldehyde body in an alkaline medium, the molecular proportion of formaldehyde to the phenol or its homologues being such that the said proportion in the finished product amounts to at least 1:1, in the presence of a compound selected from the group of substances having sulfur in the S-S-linkage and in the presence of a catalyst accelerating the action of said compounds having sulfur in the S-S-linkage.

6. A resinous composition produced by reacting at least one substance selected from the group consisting of phenol and its homologues and a formaldehyde body in an alkaline medium, the molecular proportion of formaldehyde to the phenol or its homologues being such that the said proportion in the finished product amounts to at least 1:1, in the presence of a compound selected from the group of substances having sulfur in the S-S-linkage and in the presence of an alkaline phenol-formaldehyde condensation catalyst.

7. A resinous composition according to claim 5 in which the catalyst is a known vulcanization accelerator.

IGNAZ KREIDL.